(12) United States Patent
Popineau (10) Patent No.: US 7,053,798 B2
(45) Date of Patent: May 30, 2006

(54) DEVICE FOR CONTROLLING A COMPUTER SYSTEM

(75) Inventor: Gerard Popineau, 10 rue Charles Pathé, Vincennes (FR) 94300

(73) Assignee: Gerard Popineau, Vincennes (FR)

( * ) Notice: Subject to any disclaimer, the term of this patent is extended or adjusted under 35 U.S.C. 154(b) by 477 days.

(21) Appl. No.: 10/343,041

(22) PCT Filed: Jul. 30, 2001

(86) PCT No.: PCT/FR01/02490

§ 371 (c)(1),
(2), (4) Date: Jan. 29, 2003

(87) PCT Pub. No.: WO02/10897

PCT Pub. Date: Feb. 7, 2002

(65) Prior Publication Data

US 2003/0165342 A1    Sep. 4, 2003

(30) Foreign Application Priority Data

Jul. 31, 2000  (MC) .......................................... 2453

(51) Int. Cl.
*H04B 7/00*    (2006.01)

(52) U.S. Cl. ................... 341/20; 455/41.2; 455/67.11; 345/157; 370/431; 370/277; 370/281

(58) Field of Classification Search ................. 341/20; 345/101, 103, 157; 455/41.2, 500, 509, 67.11; 463/38; 715/751; 370/470, 277, 281, 295, 370/431

See application file for complete search history.

(56) References Cited

U.S. PATENT DOCUMENTS

| 4,924,216 A * | 5/1990 | Leung .......................... 463/38 |
| 5,881,366 A * | 3/1999 | Bodenmann et al. ....... 455/41.2 |
| 5,900,869 A * | 5/1999 | Higashio ..................... 715/751 |
| 6,782,245 B1 * | 8/2004 | Lazzarotto et al. ....... 455/226.1 |

* cited by examiner

*Primary Examiner*—Albert K. Wong (57) ABSTRACT

The invention concerns a computer system (1), preferably of the personal microcomputer type, controlled by a group of users by means of several mouse-type pointing devices (3) without wired connection with the system (1). Each pointing device communicates by infrared with a console (38) connected to the system (1) through a communication port (50). A multifrequency transmission technique and a frequency hopping coding are used. The graphic interface of the system is projected (47, 48) on a large screen (49) for collective visual display. The console (38) comprises a detachable receiver horn (41) which enhances the range, and a set of switches (40) for selecting the mouse or mice controlling one or several cursors (54) of different shape and/or color. The inventive device is particularly designed for collective initiation to microcomputing and collective training in using software.

22 Claims, 6 Drawing Sheets

DEVICE FOR CONTROLLING A COMPUTER SYSTEM

TECHNICAL FIELD OF THE INVENTION

The present invention relates to a device for controlling a computer system, preferentially of the personal microcomputer type, by means of pointing devices, in particular of the wireless mouse type.

TECHNOLOGICAL BACKGROUND OF THE INVENTION

The devices for controlling a computer system consisting in moving by means of a mouse, trackball or another pointing device, a cursor in order to indicate on the screen of the system an object, icon or element of a menu, representative of a function to be carried out, are well-known. If they were in the beginning reserved to professionals working on high range graphic consoles, they are today the symbol of the democratization of the use of the computer by removing the obligation to have to learn esoteric process control languages. Even a child not knowing yet how to read can play with a computer provided with a graphic interface.

The manufacturers of pointing devices thus sought to make those of the most possible pleasant use. A constraint, generally aggravating, is the presence of the wire connecting the mouse to the central processing unit, and being used at the same time for the transmission of the data in series mode and for the power supply. This wire is always too short or clings to the most various objects. A mouse without wire is thus regarded as an improvement.

Such a pointing device is described in the European patent application EP0171747, in the name of METAPHOR COMPUTER SYSTEMS Company, published on Feb. 19, 1986. The device transmits its displacements and the states of its command buttons to the central processing unit by means of an infrared beam of light modulated in amplitude by the sequences of representative binary digits. The implementation of an infrared base band transmission is extremely simple, but it can appear reception problems due to the ambient light, which can present spectral components in the near infrared (Sun, incandescent lamps). It was thus required an improvement of the reception by using means of concentration and guidance of the received light.

The Japanese patent application JP4205129, in the name of HITACHI LTD Company, published on Jul. 27, 1992, features such a system.

Another technical problem is set by the power supply of the wireless mouse. Suppression of the wire constraint leads to another constraint obligation to reload the battery periodically before the device ceases functioning. EP017747 application brought a partial response to this problem by transmitting to the central processing unit a message of alarm intended for the user.

The European patent application EP0849700, by the PHILIPS PATENTVERWALTUNG and PHILIPS ELECTRONICS companies, published on Jun. 24, 1998, proposes a feeding of the wireless mouse by an inductive loop placed in the mouse pad. The wire of the mouse is actually removed, but the problem is moved on the level of supplying electric power in the appropriate form to the pad. A new wire is thus necessary; moreover, the user is limited in his aesthetic choices of this accessory, since the pad is obligatorily of a model especially adapted to the system.

The power supply is not a question being asked only for pointing devices of computer. It is asked for all small electronic instruments. Generally, cells are used. The periodic replacement of those can become expensive for the user, and one uses batteries more and more commonly, at the price of a more significant starting investment, in particular in a charger. For low powers, a mixed feeding by battery and solar cell, the battery playing a role of buffer, is known since the appearance on the market of cheap amorphous silicon cells. It is the case of pocket calculators or of office calculating machines. The devices described in the Japanese patent applications JP56132653 and JP61210828, respectively in the name of SEIKO EPSON CORP and of CASIO COMPUTER CO LTD, are examples among others.

The embodiment of a solar cell power supply in a wireless mouse implementing an infrared connection is described in the British patent application GB2292995, in the name of PRIMAX ELECTRONICS LTD, published on Mar. 13, 1996.

The improvements of the basic pointing device largely known in the field of microprocessing, relate only to the individual use of an information processing system. One knows possibilities of co-operating work of several people by the setting of several central processing units connected by a network. However, even if work is collective, each person personally controls each central processing unit by means of her/his own pointing device.

A system making it possible to several people to use the same central processing unit is described in the Japanese patent applications JP8221194 and JP9146703, in the name of NTT Company, published respectively on Aug. 30, 1996 and on Jun. 6, 1997. The commands coming from several wireless mice can be received by a conventional microcomputer. To this end, a time-sharing radio transmission technique is implemented. The various mice transmit successively their data when they receive an identifying code sent by the basic station connected to the central processing unit corresponding to their own codes. The envisaged use is that of education and game.

The Japanese patent application JP10040002, in the name of NEC Company, published on Feb. 13, 1998, described simultaneous operation of several mice in the same window.

The concept of a set of pointing devices controlling a single information processing system presents interesting prospects in particular in leaching. Contrary to the teaching of other disciplines, data-processing practices lends itself currently rather badly to collective courses. The training is rather based on the setting of practical working sessions, during which the pupils, by small groups of two or three, are exerted on a complete microcomputer. To let a great number of pupils to profit from an initiation, one thus needs average considerable hardware permanently installed in specialized classrooms, having many power supply plugs.

The wireless mouse systems described above in the JP9146703, JP8221194 and JP10040002 patent documents would allow on the contrary a more traditional approach of initiation into handling of a computer. Each pupil having a mouse, could, under the control of a trainer, learn how to use a graphic interface, the image of which could be projected on a large-sized screen by means of an adapted data-processing peripheral, such as a video projector, or a LCD tablet adapted to an overhead projector.

The economic advantage is obvious: only one information processing system is enough, which could consist of a portable microcomputer. The specialized rooms are not necessary any more, and the equipment can be installed quickly in any room. However, this economic advantage is a bit limited by the complexity of the known systems. The data transmission protocols between the mice and the central processing unit rely on microwave links, which force each pointing device to comprise a receiver to receive synchronization signals. Radio links present also many disadvantages in countries where there are constraining regulations with regard to frequency bands allowed for data transmission. The number of these bands is restricted and the remaining bands are extremely encumbered, therefore the use of complex data coding methods is mandatory to avoid a disturbance by a similar system operating in the vicinity.

The recourse to an infrared link would thus seem more suitable, the channels of communication by this means inside a room being preserved from external disturbances. Moreover, the system could implement electronic components having very great diffusion, since infrared remote control systems are of universal use.

The system requires at least a number of communication channels at equal to the number of pointing devices, and must be insensitive to the ambient light, but modulation techniques having the desired characteristics exist. One can quote the frequency shift keying of a subcarrier, an example of which is given in the European patent application EP0342146, in the name of TRANSDATA Company, published on May 11, 1989. The described device relates to only one bi-directional connection between an electric meter and an apparatus intended to pick up power consumption, and the implemented method could not thus be directly applied. However, hie demodulation method described in this document, based upon cabled electronics, can be replaced easily by equivalent software processing.

The European application EP0924873, in the name of ALCATEL Company, published on Jun. 23, 1999, is describing an algorithm allowing the detection of the answering tone of modems and telecopiers.

This type of algorithm of the Goertzel type, is well known, and can apply to the detection of voice frequencies. The necessary significant computing power implies the use of dedicated digital signal processing circuits, like those manufactured by ADVANCED MICRO DEVICES Company. This company reveals besides an improvement of the Goertzel algorithm in the international patent application WO97/20438, published on Jun. 5, 1997. In the technical note "DTMF Tone Generation and Detection: An implementation Using the TMS320C54x" (Application Report; SPRA096A—May 2000), the TEXAS INSTRUMENTS Company describe algorithms to make synthesis and detection of signals in a multifrequency system.

It appears from the state of the art as described in the documents quoted above, that sets of pointing devices intended for a user group for controlling a common information processing system are known, but that there is not to date any simple, robust and cheap system relying on trusted and modern techniques, which can really be implemented in particular with a view to teaching by carrying out an inventive synthesis of the state of the art in order to obtain optimal characteristics.

SUMMARY OF THE INVENTION

The present invention thus aims at optimizing the design of a device for controlling an information processing system.

It precisely has as an aim a device for controlling an information processing system, preferentially of the personal microcomputer type, provided with, in a known way, a graphic interface, and at least a communication port, by a user group by means of several pointing devices without wired connection with the system, preferentially of the wireless mouse type. Each pointing device is handled by each user and transmits by means of a communication channel sequences of binary data representative of displacements and states of these pointing devices to an electronic interface box connected to the communication port.

The device for controlling a computer system object of this invention is remarkable in that the communication channel comprises a plurality of secondary communication channels, transmitting with a standard modulation rate the binary data sequences, formed by a common infra-red carrier and a set of subcarriers modulated in amplitude by the binary digits of these sequences. The frequencies of the subcarriers are different for each pointing device, without common harmonic, and are distributed between a lower frequency and a higher frequency, with intervals at least equal to the double of the value of the modulation rate increased by a guard band.

In an advantageous way, the frequencies of the subcarriers are equal to prime numbers multiplied by a constant coefficient.

In a first mode of realization of the invention, only one subcarrier is assigned to each pointing device.

In a second mode of realization, one assigns to each pointing device two subcarriers modulated in opposition of phase by the binary digits of the sequences.

In the first mode of realization of the invention, the control system features pointing devices that comprise each one:

a) a block of digital processing of the signals including preferentially a microcontroller working out the binary digits
b) a block of emission including:
   an oscillator, preferentially with interchangeable ceramic resonator, tuned on harmonic N of the frequency of the subcarrier assigned to the pointing device
   a frequency divider by N producing the subcarrier starting from its harmonic
   a modulator of the subcarrier by the binary digits producing the modulated signals
   a band pass filter with a center frequency equal to that of the subcarrier and a bandwidth equal to the interval of frequency decreased of the guitar band, generating filtered signals starting from the modulated signals.
   an amplifier feeding one or more diodes emitting an infrared beam of light starting from the filtered signals.
c) a power supply unit including:
   a solar cell
   a battery
   a regulator of the load of the battery by the solar cell
   a DC/DC converter In the second mode of realization of the invention, the control system features pointing devices that comprise each one:

a) a block of digital processing of the signals preferentially including a microcontroller provided with:
   a first program working out the binary digits
   a second program constituting a digital oscillator working out the samples of the modulated subcarriers.
b) a block of emission including:
   a digital analog converter for converting the sampled subcarriers
   a band pass filter with a center frequency equal to that of the subcarrier and a bandwidth equal to the interval of frequency decreased of the guard band, generating filtered signals starting from the modulated signals.
   an amplifier feeding one or more diodes emitting an infrared beam of light starting from the filtered signals.

c) a power supply unit including:
   a solar cell
   a battery
   a regulator of the load of the battery by the solar cell
   a DC/DC converter.

An additional feature of the first mode of realization is that the electronic box comprises:

a) a block of reception of the infrared light signals and of detection of the subcarriers.
b) a block of frequential demutltiplexing of the detected signals including a number of analog band pass filters equal to the number of pointing devices.
c) a block of digital processing of the signals preferentially including a microprocessor provided with a communication program working out the binary digits starting from the demultiplexed signals and transmitting them to the communication port by means of a line amplifier.

An additional feature of the second mode of realization, which also constitutes an alternative of the first mode, is that the electronic box comprises:

a) a block of reception of the infrared light signals and of detection of the subcarriers.
b) a block of digital processing of the signals including:
   an analog/digital converter of the detected signals
   a microprocessor, or similar, provided with a Discrete Fourier Transform algorithm for extracting the spectral information of the detected signals, preferentially a two poles digital filter with infinite impulse response of the Goertzel type, and a communication program working out the binary digits starting from this information and transmitting them to the communication port by means of a line amplifier.

In one or the other of the modes of realization described above, the line amplifier is bi-directional and transmits to the microprocessor, or similar, sequences of binary data representative of displacements of an additional pointing device.

Very advantageously, the electronic box of the device for controlling a computer system according to the invention comprises a distinct part including the block of reception, provided with a collecting horn of the beams of infra-red light, and linked by a shielded cable to the principal part connected to the communication port.

Contributing to the goals of the invention, the electronic box comprises a principal part in form of console provided with switches making it possible to select one or more pointing devices and to make inoperative the others.

Advantageously, the binary digits emitted by each pointing device transmit moreover periodically sequences of binary data for signaling these devices so that an alarm is set off when any of these sequences is not received any more by the electronic box after a predetermined amount of time.

According to the invention the binary digits transmit moreover sequences of binary data characteristic of the integrity of each pointing device, preferentially of the presence of the ball in the wireless mouse type.

It is also advantageous that each pointing device comprises moreover push buttons in a number at least equal to 2, preferentially 7, whose sequences of binary data representative of their states are included in the aforementioned binary digits.

One will draw a great benefit from tie use of the control device according to the invention in particular for an information processing system including:
   a central processing unit preferentially of the portable computer type.
   a peripheral display preferentially of the LCD tablet type adaptable to an overhead projector, or a portable video-projector
   an application software set of the office automation or communication type, or specific of a function or a trade and when this use is collective initiation with microprocessing and collective training to the use of that software.

One will also draw benefit from the use of the control device according to the invention with the same hardware supporting an application software bundle of the computer-assisted presentation type, preferentially in the case of commercial presentation making it possible to an individual of a group of customers to choose a product or service by means of the pointing devices, and to visualize information about this product or service.

Another advantageous use of the device for controlling a computer system according to the invention with the above configuration implements an application software set of the computer-assisted learning type. This use is preferentially the collective taking of multiple-choice examinations the answers of which are selected by means of the push buttons of the pointing devices.

Preferably, the computer system, the pointing devices, and the electronic box are placed on a trolley held at the disposal of the users, that they are coaches, presenters or teachers, to be taken along and used in buildings not presenting special electric wiring.

The advantages of these various uses are still increased when the information processing system comprises moreover keyboard simulation software making it possible to simulate a keystroke by pointing the simulated image of this key by means of one of the pointing devices.

The users appreciate the use of the device according to the invention when the information processing system comprises moreover a software allotting a cursor of different form and/or color to each pointing device according to the identifying binary data sequences of the transmitting pointing devices included in the signals by the communication program of the electronic box.

These few essential specifications, resulting from the optimal design of the device for controlling a computer system, make obvious for the expert the advantages brought by the invention compared to the background art.

DESCRIPTION OF PREFERRED EMBODIMENTS OF THE INVENTION

The references on FIGS. 1 to 10 will be used to explain in details the various characteristics of the invention.

Figure 1:
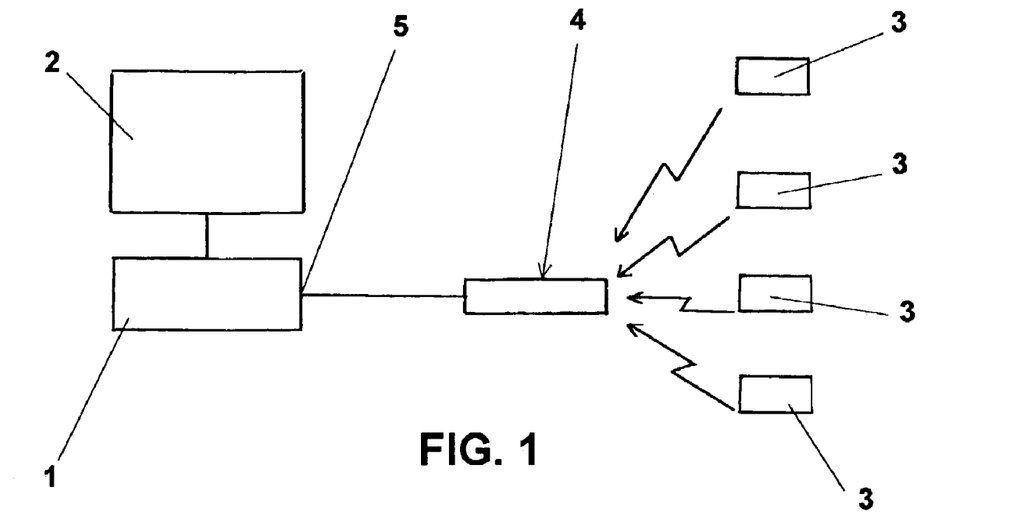
FIG. 1 is a diagram of the device for controlling a computer system by a group of users according to the known general concept of the state of the art.

The general concept of the device is illustrated by FIG. 1. A microcomputer 1 comprises an operating system presenting a graphic interface that allows users to interact with the system by means of a screen display 2 and pointing devices 3. The signals emitted by the pointing devices 3 are received by an electronic box 4 connected to a communication port 5, generally a serial port, of the central processing unit 1.

In a common microcomputer system under WINDOWS®, the pointing devices are mice, or track-balls which communicate their displacements and the actions of the user on their control buttons (clicks) to the operating system by a RS232 link. For MICROSOFT® compatible mice, X and Y displacements, and the right R and left L buttons states are coded in three words comprising 1 START bit, 7 data bits, and 2 STOP bits, transmitted at 1200 bauds. To be compatible with any system under WINDOWS® by emulating a compatible mouse, the electronic box 4 has thus an operating mode in which he binary sequences of data emanating of all the mice are transmitted with this format and at this speed by the serial communication port 5.

In a first mode of realization of the device according to the invention, all the elements of a standard mouse are included in order to carry out economies of scale. For each one of these mice, it is thus a question of transmitting by infrared a set of binary sequences of data having a modulation rate of 1200 bauds. The total number of mice was selected equal to 32, both for practical reasons (It is the size of a class) and technical reasons (Number of bits of the ports and buses of microprocessors used).

In a second mode of realization, not relying any more on standard elements, the majority of the electronic functions being carried out by digital processing of the signals, a modulation rate of 1200 bauds will be however preserved for compatibility reasons.

The selected infra-red data transmission technique is a frequency multiplexing technique limited in a lower and upper range of a frequency band, either by the characteristics of the band pass filters used in the first mode of realization, or by the number of nominal MIPS of the microprocessors implemented in the second mode of realization.

In the realization with analog electronics, only one subcarrier modulated in amplitude is assigned to each mouse in order to limit the complexity of the electronic box 4.

The numerical realization allows the use of a greater number of filters for the demultiplexing without increase in complexity. Two subcarriers are assigned to each mouse. The two subcarriers are modulated in opposition of phase by the binary digits of the frames of bits emanating from the sensors of the mouse, so it means, in fact that a frequency shift keying (FSK) modulation increasing considerably the S/N ratio of the transmission is used.

Figure 2:
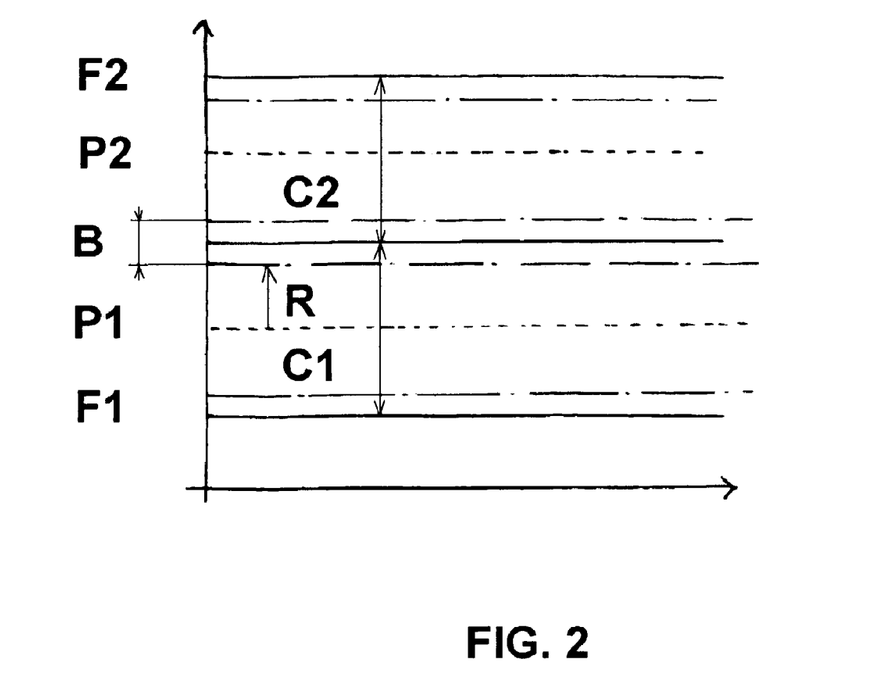
FIG. 2 is an explanatory diagram of the frequency multiplexing method implemented in the device for controlling a computer system according to the invention.

FIG. 2 shows the distribution of the frequencies of the subcarriers P1, P2 between a lower frequency F1 and an upper frequency F2.

To satisfy Nyquist criterion, the frequency band allocated to each pointing device is at least 2400 Hz; the interval C1, C2 between each subcarrier P1, P2 is thus at least 2400 Hz.

The band pass filters used in the first mode of realization are tone decoders, for example of the LM567 type from NATIONAL SEMICONDUCTOR Company. For this circuit, the maximum bandwidth $\Delta F$ is related to the center frequency F0 by the relation: $\Delta F = F0/0,14$.

The lower frequency F1 must thus be higher than 17 KHz.

To prevent that subcarriers have common harmonics, their frequencies are equal to prime numbers multiplied by a constant coefficient. The following table gives examples of the frequencies used for the 32 secondary transmission channels in this mode of realization.

| Channel | Prime number | Subcarrier frequency (Hz) | Clock frequency clock (Hz) |
|---|---|---|---|
| 1 | 113 | 22600 | 180800 |
| 2 | 139 | 27800 | 222400 |
| 3 | 157 | 31400 | 251200 |
| 4 | 173 | 34600 | 276800 |
| ... | ... | ... | ... |
| 30 | 617 | 123400 | 987200 |
| 31 | 631 | 126200 | 1009600 |
| 32 | 647 | 129400 | 1035200 |

The constant coefficient is equal to 200.

The interval C1, C2 between the frequencies of the subcarriers P1, P2 is approximately of 3 KHz, which spares an acceptable guard band B. The lower limit F1 of the communication channel is F1=19600 Hz, the upper limit is F2=130900 Hz.

In the second realization mode, relying on numerical oscillators, there are no more constraints on F1 and F2, and the guard band could be smaller. For compatibility reasons, the same distribution of frequencies was kept. There are thus 64 frequencies with an interval of 3 KHz from 22600 Hz.

The table above shows a clock frequency.

Figure 3:
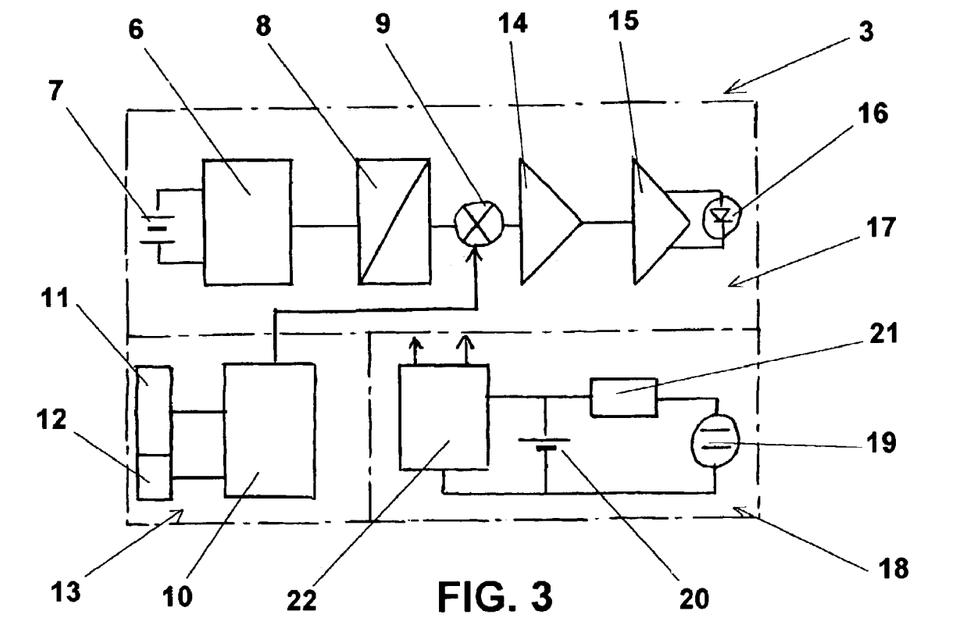
FIG. 3 is a simplified electronic diagram of each pointing device of the control device according to a first mode of realization of the invention.

As FIG. 3 shows it, each subcarrier P1, P2 is indeed produced by analog means starting from its eighth harmonic.

An oscillator 6 stabilized by a ceramic resonator 7 generates a square signal the frequency of which is divided by eight by a binary counter 8. The ceramic resonators used are resonators of the CERALOCK® type having suitable precision and frequency band.

The square signal at the frequency of the subcarrier P1, P2 is switched 9 by the binary signals coming from a microcontroller 10 processing the signals from the incremental position sensor 11 of the pointing device 3, and the buttons 12.

The microcontroller 10 and the sensors 11, 12 form a block of digital processing of the signals 13, which is preferentially a standard mouse electronic module. For example, a microcontroller of the COP800 type from NATIONAL SEMICONDUCTOR Company was used.

The modulated square signals are filtered by a band pass filter 14 the center frequency of which is that of the subcarrier P1, P2 and the bandwidth of which is equal to 2400 Hz. The resulting signal is applied to an amplifier 15, which attacks an infrared emitting diode 16. The diode used is a diode the reference of which is SFH415-T, from SIEMENS Company, whose emitting power at 950 nm lies between 25 and 50 mW per steradian.

The unit including the oscillator 6, the divider 8, the filter 14, the amplifier 15 and the infrared diode 16 constitutes a block of emission 17 which is preferentially inserted in a basic element of a standard mouse 13.

The power supply unit 18 is another significant element of the pointing device. It includes a solar cell 19 charging a battery 20 through a regulator 21. The various tensions necessary to the circuits are generated by a DC/DC converter 22 starting from the tension of the battery 20.

Figure 4:
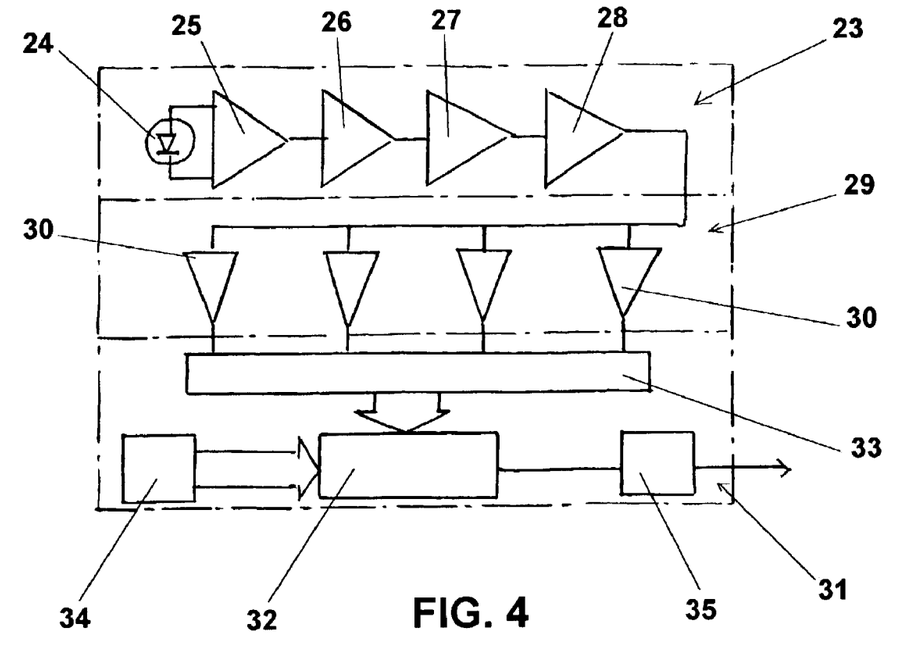
FIG. 4 is a simplified electronic diagram of the electronic box of the control device according to a first mode of realization of the invention.

FIG. 4 schematically shows the receiver of the signals transmitted by the pointing devices according to the first mode of realization of the invention.

The block of reception 23 includes a photodiode 24 receiving the beams emitted by the pointing devices 3 AC coupled to the input of a current amplifier 25. This amplifier 25 is followed by a second stage 26, and by two filters 27, 28 for rejecting the 50 Hz and 100 Hz components which can be present in the signal (or 60 Hz and 120 Hz components, according to the localization).

The spectral characteristics of the photodiode 24 are adapted to those of the emitted light. A photodiode 24 of the BPW34-F type, from SIEMENS Company, presenting a maximum of sensitivity at 950 nm and provided with an ambient light filter, is used. The amplifiers 25, 26 are circuits of the LM 13700 type from NATIONAL SEMICONDUCTOR Company, which comprise two transconductance amplifiers which can be wired as amplifiers with automatic gain control (AGC).

The amplified signals are transmitted to a demultiplexing block 29 made of a set of tone decoders 30, each one generating a logical signal 0 when a signal has a frequency within its respective bandwidth.

The logical signals are processed in a digital processing block 31 by a microprocessor 32 a parallel port of which acquires these logical signals which are memorized by a set of 3-state latches 33. The program of tie microprocessor 32 takes into account the data of the registers 34, representative of a selection of pointing devices and of an operating mode, to generate the binary digits transmitted by means of a line amplifier 35 to the communication port 5 of the central processing unit 1. The line amplifier 35 being bi-directional, the microprocessor also receives frames of data transmitted by the central processing unlit 1, in particular from its own internal pointing device (a trackball or similar), or from an additional mouse connected to an auxiliary port of case 4.

The components that are used are logical circuits of everyday usage. As a nonrestrictive example, the following circuits were implemented:
microprocessor 32: MC68705P3 from MOTOROLA Company
3-state latches 33: DM74LS534 from FAIRCHILD Company
registers 34: DM74LS374 from FAIRCHILD Company
line amplifier 35: MAX232 from MAXIM Company.

In this example of embodiment, the microprocessor which is used does not comprise a serial communication port, therefore an interface circuit of the asynchronous communication interface adapter (ACIA) type is implemented (MC6850 circuit reference of MOTOROLA Company)

Figure 5:
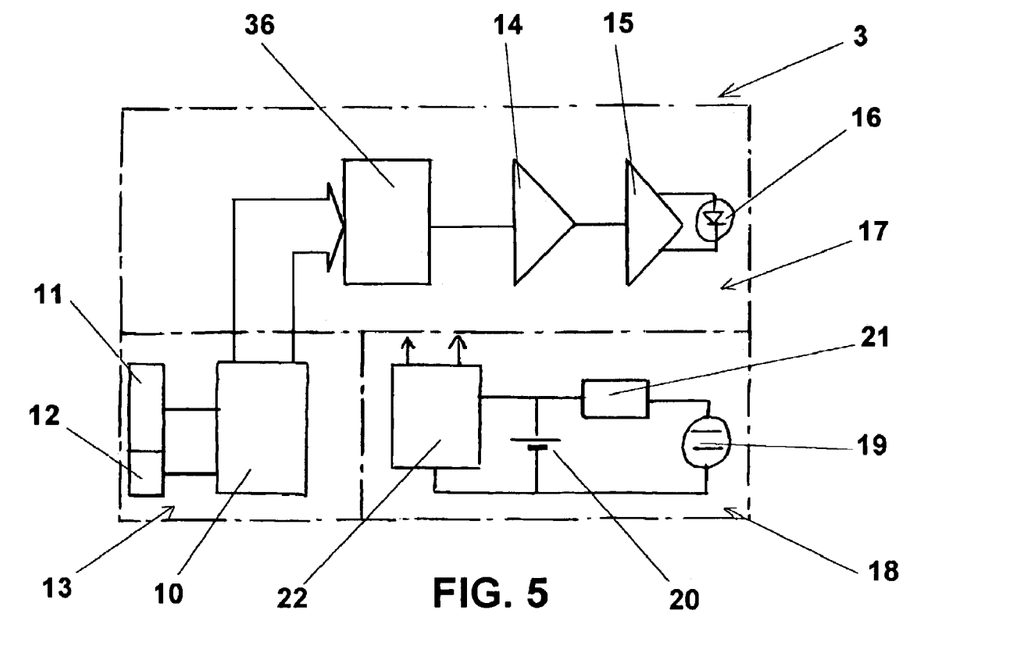
FIG. 5 is a simplified electronic diagram of each pointing device of the control device according to a second mode of realization of the invention.

In a second mode of realization of the internal electronics of each pointing device 3, the generation of subcarriers P1, P2 is implemented by an entirely numerical method. As FIG. 5 shows it, the block of emission 3 is thus simplified. The microcontroller 10 comprises, in addition to the program, which is used to generate the binary digits representative of the displacements and of the state of the mouse, a second program working as a numerical oscillator. The necessary computing power is significant, and is estimated at a few tens of MIPS, but the available power supply is limited. A circuit of the TMS320C54x type from TEXAS INSTRUMENTS Company was thus selected for its low power (Supply voltage 3.3 V; 0,54 mW/MIPS). The algorithm is described in the various application notes that are published by this company and will not be added here. The samples of the modulated subcarriers are transmitted to a digital analog converter 36, then applied to the same components as in the block of emission 3 of the first mode of realization: band pass filter 14, amplifier 15, and infrared diode 16.

In this mode of realization, 64 subcarriers are used. The higher frequency exceeds 200 KHz. The Shannon sampling theorem thus prescribes a sampling rate of more than 400 Khz. Taking into account the problem arising from the electric power balance, the converter 36 of the AD7524 type from ANALOG DEVICES Company was selected.

Figure 6:
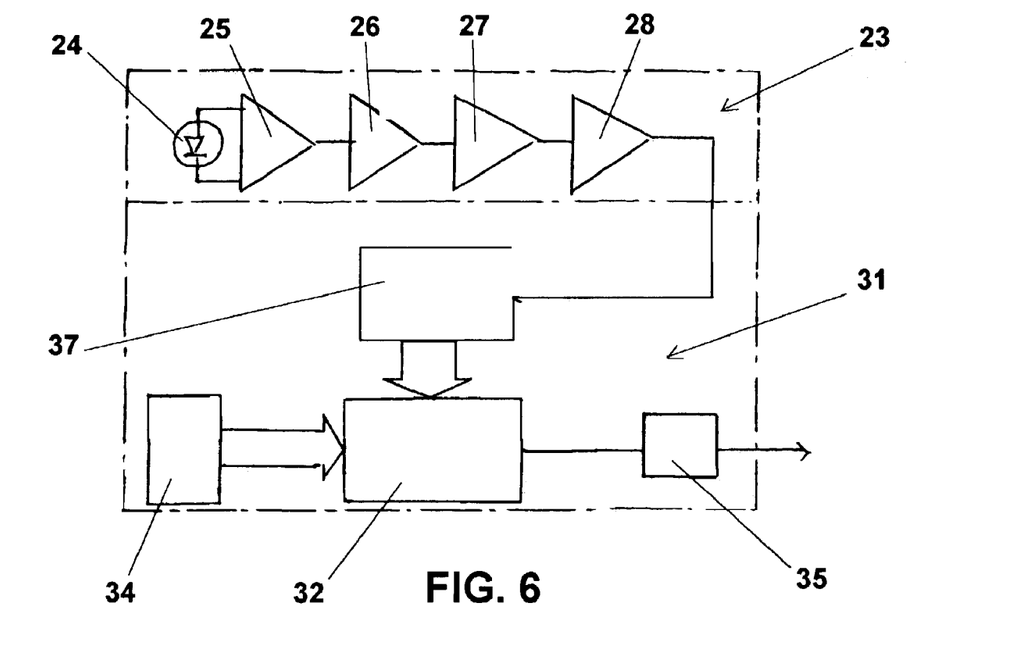
FIG. 6 is a simplified electronic diagram of the electronic box of the control device according to a second mode of realization of the invention.

FIG. 6 also shows that the electronic box is simplified considerably in this mode of realization, since die set of tone decoders 30 disappeared. The decoders 30 are replaced by only one analog/digital converter 37 which places the samples of the detected signals on the data bus of the microprocessor 32.

For the same reasons as previously, this converter 37 is a fast converter. The model that is appropriate is a circuit of the AD7822 type from ANALOG DEVICE Company, able to reach a maximum sampling rate of 2 MSPS.

The Goertzel algorithm which is used to extract spectral information from the sampled signal is a particular case of calculation of a discrete Fourier transform, and will not be explained in details here, insofar as all the explanations appear in the technical note "DTMF Tone Generation and Detection: an implementation Using the TMS320C54x" (Application Report; SPRA096A-May 2000), published by TEXAS INSTRUMENTS Company, already quoted.

According to indications given in this document, the processing of the 64 sampled channels which are sampled at 500 KHz rate needs a computing power close to 200 MIPS.

This second mode of realization does not call for other particular observations, insofar as the main part of five functions of the electronic box are carried out by software modules of existing libraries, which were adapted.

Figure 7:
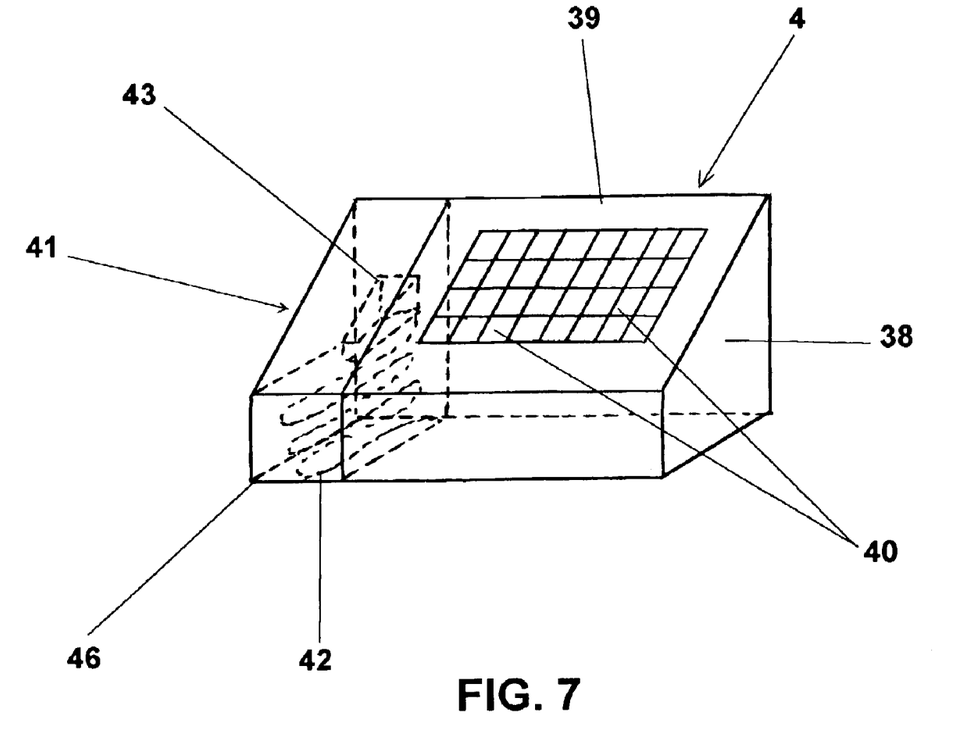
FIG. 7 is a diagrammatic general view of the electronic box of the device for controlling a computer system according to the invention.

The case inside which the above mentioned electronic elements are placed, is shaped, as FIG. 7 shows it, like a console 38. The higher part 39 presents a set of 32 switches 40 making it possible to select one or more pointing devices 3 and to make inoperative the others. The states of these switches 40 are memorized in registers 34 read by the microprocessor 32. The console 38 also comprises a selector of the operating mode of the electronic box 4. Three basic operating nodes are possible:
a first operating mode where only one mouse 3, selected by one of the switches 40, acts on the central processing unit 1.
a second operating mode where all the mice act on the same cursor 54
a third operating mode where each mouse acts on a cursor 54 which is its own one The selected basic operating mode is also memorized in a register 34, and is read again by the microprocessor 32 that launches the adequate program. In an alternative of the second and third modes, the mice 3 that act on the cursors are selected by the switches 40.

Figure 8:
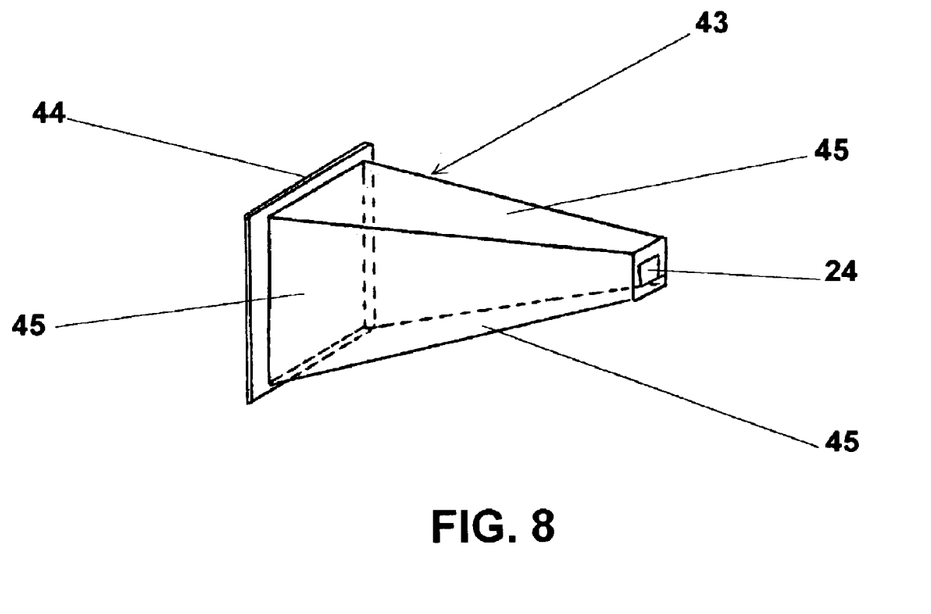
FIG. 8 is a diagrammatic view of the collecting horn, which the electronic box comprises.

The electronic box 4 comprises a part, distinct 41 from the console 38, including the whole reception block 23. This part 41 is connected by a shielded cable 42 to the console 38, and is generally distant from it in operation, but is locked with it if circumstances are favorable. It comprises indeed an antenna horn 43 intended to collect the beams of infrared light emitted by the mice 3. The collecting horn 43 is placed in height, and is laid out in order to cover the entire zone where mice 3 are used. The cable 42 ensures the power supply of the block of reception 23 and the transmission of the detected signals towards the console 38. As FIG. 8 shows it, the antenna horn 43 has the general shape of a truncated pyramid with a square base, forming a funnel. A red filter 44 is placed at the entry. The internal walls 45 are silver plated and reflect the collected infrared rays towards the photodiode 24. An antenna the base of which measures 30 mm×30 mm, the section at the level of the photodiode 9 mm×9 mm, and the height is 60 mm gave good results. Incidentally, this part 41 which contains the horn 43 and the block of reception 23, and matches the shape of the console 38 by prolonging it when it is locked with it, includes a housing 46 to place folded up cable 42.

In the first mode of realization of each pointing device 3, an electronic module of a standard mouse is used preferably. This electronic unit generally includes a specialized integrated circuit (For example the TP8375 serial mouse controller TP8375 from Topro Technology Inc Company) by means of which the functionalities of a standard mouse comprising a ball and three push-buttons are implemented.

As it will be further described, particular applications will use with profit push buttons in a number higher than 2 or 3 traditional buttons. In this case the binary digits switching the subcarrier P1, P2 must contain the sequences of binary data representative of these additional buttons. These sequences are generated either by a specific cabled logic, or by a microcontroller, and are inserted in the flow controlling the transmitting diode 16 by an OR gate in the time intervals when the standard electronic unit does not transmit data.

In the same way binary sequences of the pointing device 3 signaling data can be transmitted periodically. Received normally by the interface electronic box 4 at regular time intervals, the loss of the reception of these signaling sequences means anomaly of the pointing device 3, disturbance of the infrared link, or voluntary dissimulation of the pointing device 3 involving the screening of the transmitting diode 16.

An infrared connection has thus an advantage compared to a connection by Hertzian waves, because a pointing device 3 cannot be carried apart from the room where the interface electronic box 4 is without that being immediately detected. If the console 38 were provided with indicators beside each switch 40, the flickering of the corresponding indicator makes it possible to announce the pointing device about to be stolen. This anti-theft function is a significant characteristic for a device of which the use is mainly collective.

In the same way, with a similar aim, sequences of binary data characteristic of the integrity of each pointing device 3 can also be transmitted. The unauthorized disassembling of the various elements of the pointing device 3 (case, battery 20, ball . . . ) is easily detected by micro-switches, or any other type of sensors.

A modification of the state of these sensors is transmitted to the electronic box 4 and sets off either all alarm on case 4 itself, or an alarm on the information processing system 1. This anti-disassembling function is also significant for a public use.

Other types of alarms can be started by each pointing device 3. A special button switched by the user of a pointing device can start the flickering of the corresponding indicator on the console 38, in order to draw attention. To facilitate the maintenance of each pointing device 3, messages concerning their operation can be transmitted, in particular the load state of the battery 20.

All these functionalities (theft protection device, antidisassembling, call, and assistance with maintenance) are more easily implemented in the second mode of realization by software. However, all the combinations are possible between the first and second modes of realization described in details above.

For example, nonrestrictive, if the standard mouse element is not based on a specific integrated circuit, but on a microprogrammed microcontroller, the microcode will be modified consequently.

The man skilled in the art will be able to consider many other ways of fulfilling the basic functions of each pointing device 3 and of the electronic interface 4.

So the oscillator 6 for generating the subcarrier P1, P2 of each pointing device will not be inevitably stabilized by a ceramic resonator 7, or with quartz. The circuit could be a pulse generating circuit with an external RC network, having a good temperature stability and with respect to the variations of the supply voltage, such as for example an integrated circuit of the timer type. The higher harmonics of the produced square signals will not be necessarily filtered with the emission, those in fact being largely attenuated by the limited band-width of the receiving photodiode 24 and of the block of reception 23. It could be also a voltage-controlled oscillator (VCO), in particular if two subcarriers P1, P2 are used. These simplifications take place if the number of necessary pointing devices 23 is lower than 32, for example 16, 8 or 4, for particular applications.

In the first mode of realization, the baud pass filters used are preferentially very selective tone decoders, but with relatively narrow sensitivity range. High Q active filters, based on operational amplifiers, can alternatively be implemented. In case of unfavorable signal/noise ration, phase locking loops could be selected.

The mode of connection described at present between the electronic interface box 4 and the information processing system 1 is a serial connection of the RS22 type. This mode of connection is most widespread. However, the expert will not have any difficulty in replacing RS232 interface by an interface of the PS/2 or even the USB (Universal serial bus) type.

As it was already indicated, tile goal of this control device of an information processing system is to offer a new means of collective training to the microprocessing techniques.

Figure 9:
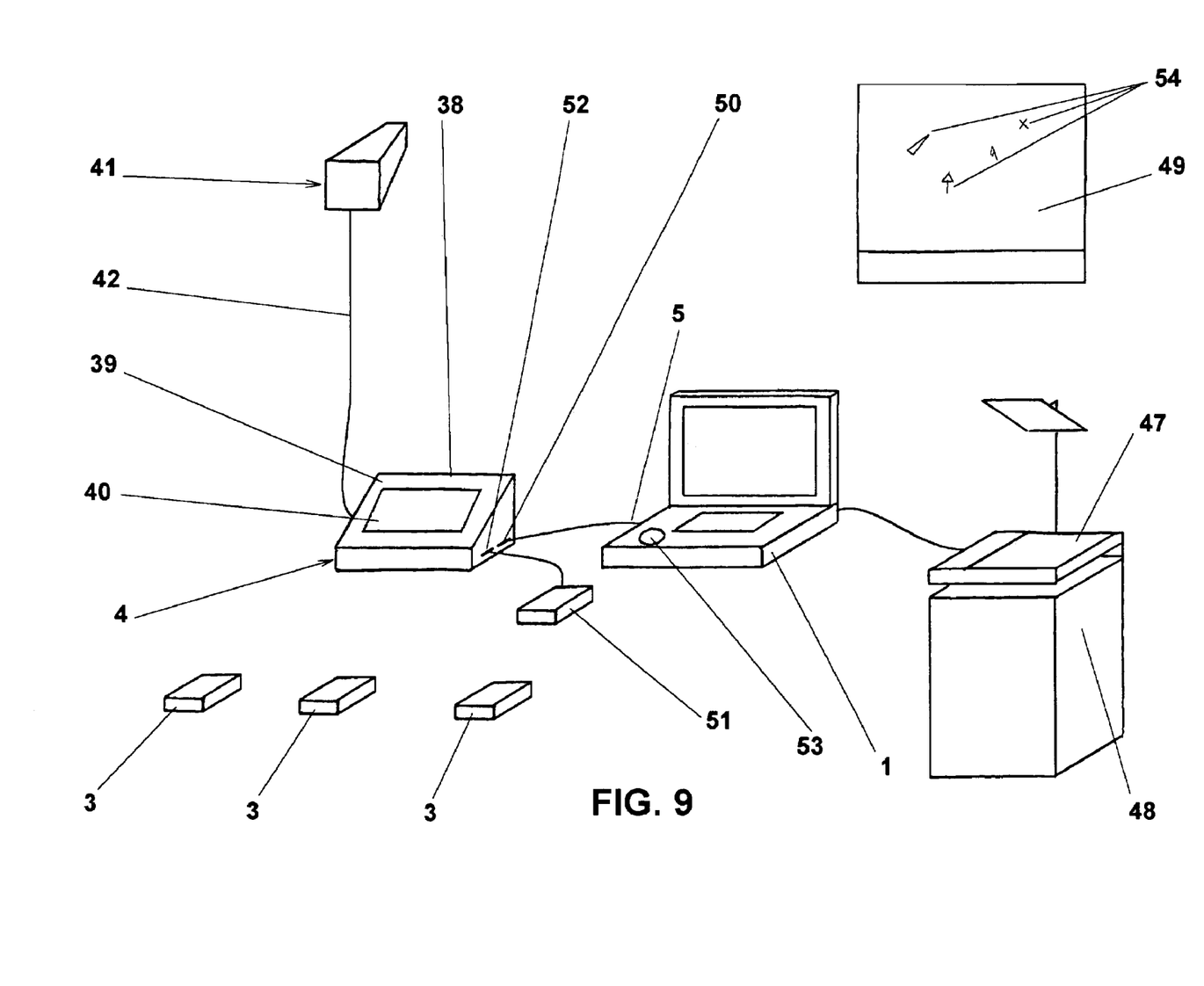
FIG. 9 is a general view of an information processing system using the control device according to the invention.
Figure 10:
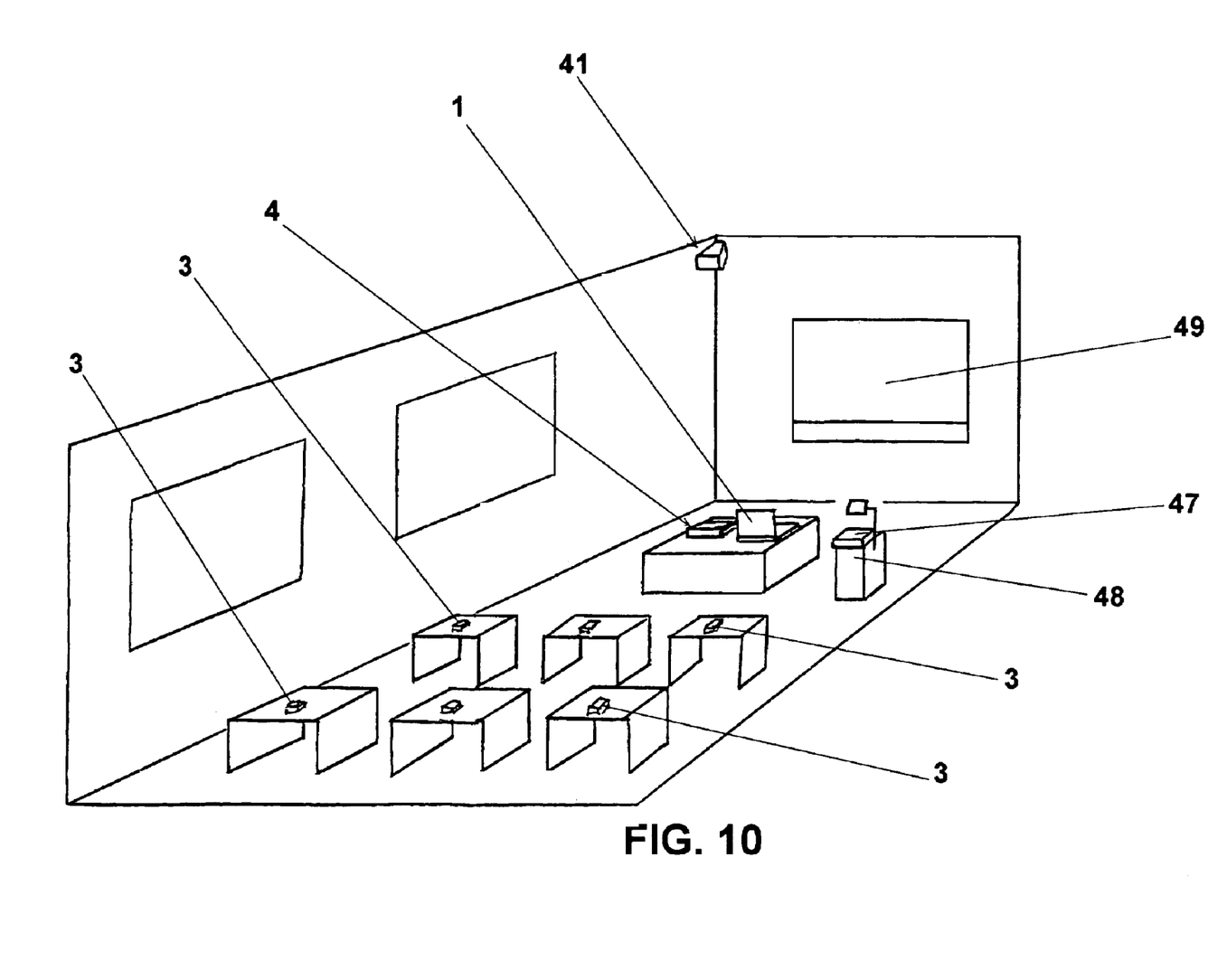
FIG. 10 is a general view presenting a preferential use of the information processing system of FIG. 9.

A suitable computer system using the control device according to the invention is represented on FIGS. 9 and 10, without this example being restrictive.

This system includes:
a portable computer 1 under WINDOWS®
a LCD tablet 47 connected to tile video outlet of the computer 1
an overhead projector 48 of the type usually used for the projection of transparencies
a screen 49 on which is projected the image of the screen of microcomputer 1.

The communication port 50 of the electronic box 4 is connected to the mouse ports (Generally COM1) of the microcomputer. An additional mouse 51 is connected to the auxiliary port 52 of case 4, if the trackball 53 of the microcomputer 1 is not usable. The part 41 containing the reception horn 43 is placed in order to collect the signals emitted by the mice 3 as well as possible.

A LCD 47 tablet presenting a 800×600 points resolution (SVGA) usable with a projector 48 of strong luminosity is preferable.

Under the control of the trainer, the people handling mice 3 learn how to move a cursor 54, and to use the various application software modules installed on system 1.

In a graphic environment, the use of the keyboard is limited enough; however the trainer has the possibility of displaying in bottom of screen 49 the image of a keyboard. The designation of the image of a key by a cursor simulates corresponding striking. This result is obtained by means of application software suitable for the operating system.

The normal use of the control device according to the invention, seems to be the first operating mode in which each person has successively the possibility of acting on only one cursor 54, because that corresponds to die usual rule of speech in group.

However teaching projects could make profitable the third operating mode of the device, where each person has her/his own cursor 54, provided that the application software lend themselves or are adapted to it.

With this goal, in this last operating mode, the communication program of microprocessor 32 incorporates in the binary digits transmitted to the central processing unit 1 binary sequences of data of identification of the pointing devices transmitting these signals. These sequences are treated, insofar as there is no incompatibility with the type of operating system under which the central processing unit functions 1, by a driver suitable for interface 4 to visualize the cursors assigned to each pointing device 3. All cursors 54, of different form and/or color for each running pointing device 3, can appear simultaneously on the screen 49, or only the cursors 54 corresponding to devices 3 selected by console 38.

Software using the specific functionalities of the control device of an information processing system object of this invention could be developed by the educational software publishers. For example, software allowing the collective taking of multiple-choice examinations (MCE). For a questionnaire with three possible answers, a pointing device 3 only provided with the three traditional buttons is enough. The questions are displayed automatically during a given time on screen 49 to the sight of the pupils. Each one of those selects her/his response by means of the mouse buttons. The results of the MCE and the statistics of the class are automatically calculated at the end of the test. More complex MCE will make profitable the additional buttons of pointing devices 3.

In order to increase the simplicity of implementation of the control device of a computer system 1 according to the invention, and to draw the maximum of benefit of its use, thus one could be added to the elements of the multi-media trolley, already ii use in school establishments. This trolley, a kind of special piece of furniture on casters, supports a central processing unit 1 of the PC type, with keyboard, mouse, CD-Rom or DVD player, loudspeakers, screen, and printer. It can be moved from classroom to classroom, without special wiring, according to needs, to carry out demonstrations of software. It is conceived easily that the control device of an information processing system according to the invention will bring an outstanding dimension to the multi-media trolley.

Other collective uses of the device are possible, in particular in the field of the commercial presentation. These presentations are currently carried out using software of the computer-assisted presentation (CAP) type. They are not interactive, and the customer or prospective customer must undergo the statements of the representative passively. By means of the device according to the invention, the customers can direct the presentation according to their wishes while clicking on the links returning to the aspects of the product or the service which interest them. On this principle, promotional operations could be organized in the supermarkets.

A video-projector connected to the computer system comprising the multiple wireless mice according to the invention can also create a virtual shop-window: each customer selects the desired product by means of the cursor corresponding to the pointing device with which she/he was provided, and can zoom the image of the product, or obtain other information, like price or availability. A product not appearing in the shop-window can be called starting from menus or lists. Several products can be visualized simultaneously by the customers. Each customer can possibly place the order of the article that she/lie selected, and recover later on this article at the desk starting from a command reference.

The potential uses of the control device of an information processing system according to the invention are thus multiple, and completely renew the collective applications of microprocessing in a prospect different from existing network and workgroup applications.

They are not dependent on any particular data-processing environment, in particular WINDOWS® for example, but are open on any operating system presenting a graphic interface, such as for example LINUX provided with X-WINDOW.

It is to be understood that the invention is not limited to the only modes of carrying out the invention, given by way of examples above; it embraces, on the contrary, all the possible alternatives of realization. In particular all those resulting from all optimization of the device for a particular use, for example relating to:

- the number of pointing devices, adapted to the maximum number of foreseeable participants, which inevitably affects the complexity of the device and thus its manufacturing cost.
- the range adapted to small rooms, premises of average size or large rooms, lecture rooms, lobbies or others, which implies different powers of emission, possibly the implementation of several infra-red diodes in parallel, or series-wound, in each pointing device.
- conditions of ambient light: in particular fluorescent tubes, or suit, in case of a use in full day, outside or under canopy.
- the use in places where a dense crowd, smoke, water vapor, luminous flashes can disturb the infrared links (bars, dance-halls, theaters . . . )

would not depart from the new and inventive framework of this invention.

The invention claimed is:

1. Device for controlling a computer system by a group of users, said computer system comprising a graphical user interface and a communication port, and said device having an interface electronic box to be connected to said port and several pointing devices without wired connection with said interface electronic box and, each one of said pointing devices being handled by each one of said users to visually control the continuous movement and the appearance of at least an object displayed by said graphical user interface, and each one of said pointing devices comprising transmitting means to transmit on a communication channel sequences of binary data representative of displacements and states of said pointing devices to said interface electronic box, characterized in that said channel has a plurality of secondary communication channels formed by a common infrared carrier and a set of subcarriers modulated in amplitude at a standard modulation rate by the binary digits of said sequences, said subcarriers having different frequencies for each one of said pointing devices, without common harmonic, and being distributed between a lower frequency and a higher frequency, with intervals at least equal to the double of the value of the said standard modulation rate increased by a guard band.

2. Device for controlling a computer system according to claim 1, characterized in that the frequencies of said subcarriers are equal to prime numbers multiplied by a constant coefficient.

3. Device for controlling a computer system according to claim 1, characterized in that only one of said subcarriers is assigned to each one of said pointing devices.

4. Device for controlling a computer system according to claim 1, characterized in that two of said subcarriers modulated in opposition of phase by said binary digits are assigned to each one of said pointing devices.

5. Device for controlling a computer system according to claim 3, characterized in that each one of said pointing devices comprises:
   a) a block of digital processing working out said binary digits,
   b) a block of emission including:
      an oscillator tuned on harmonic N of the frequency of said one subcarrier assigned to said one pointing device,
      a frequency divider by N producing said one subcarrier starting from its harmonic,
      a modulator of said one subcarrier by said binary digits producing modulated signals,
      a band pass filter with a center frequency equal to that of said one subcarrier and a bandwidth equal to said interval decreased of said guard band, generating filtered signals starting from said modulated signals,
      an amplifier feeding one or more diodes emitting an infrared beam of light starting from said filtered signals,
   c) a power supply unit including:
      a solar cell,
      a battery,
      a regulator of the load of said battery by said solar cell,
      a DC/DC converter.

6. Device for controlling a computer system according to claim 4, characterized in that each one of said pointing devices comprises:
   a) a block of digital processing provided with:
      a first program working out said binary digits,
      a second program constituting a digital oscillator working out the samples of modulated said subcarriers,
   b) a block of emission including:
      a digital/analog converter for converting said samples,
      a band pass filter generating filtered signals from converted said samples,
      an amplifier feeding one or more diodes emitting an infrared beam of light starting from said filtered signals,
   c) a power supply unit including:
      a solar cell,
      a battery,
      a regulator of the load of said battery by said solar cell,
      a DC/DC converter.

7. Device for controlling a computer system according to claim 1, characterized in that said interface electronic box comprises:
   a) a block of reception of said carrier and of detection of said subcarriers,
   b) a block of frequential demultiplexing of detected said subcarriers including a number of analog band pass filters equal to the number of said pointing devices,
   c) a block of digital processing including a microprocessor, or a microcontroller, provided with a communication program working out said binary digits starting from demultiplexed said subcarriers and transmitting them to said communication port by means of a line amplifier.

8. Device for controlling a computer system according to claim 1, characterized in that said interface electronic box comprises:
   a) a block of reception of said carrier and of detection of said subcarriers,
   b) a block of digital processing of detected said subcarriers including:
      an analog/digital converter of said detected subcarriers,
      a microprocessor, or a microcontroller, provided with a Discrete Fourier Transform algorithm for extracting the spectral information of detected said subcarriers, and a communication program working out said binary digits starting from said spectral information and transmitting them to said communication port by means of a line amplifier.

9. Device for controlling a computer system according to claim 7, characterized in that said line amplifier is bidirectional and transmits to said microprocessor, or said microcontroller, additional sequences of binary data representative of displacements of an additional pointing device.

10. Device for controlling a computer system according to claim 7, characterized in that said interface electronic box comprises a distinct part including said block of reception, provided with a collecting horn for collecting the infrared beams emitted by said pointing devices, and linked by a shielded cable to a principal part connected to said communication port.

11. Device for controlling a computer system according to claim 1, characterized in that said interface electronic box comprises a principal part in form of console provided with switches making it possible to select one or more of said pointing devices and to make inoperative the others.

12. Device for controlling a computer system according to claim 1, characterized in that said sequences of binary data comprises moreover periodic sequences of binary data for periodically signalizing the presence of said pointing devices to said interface electronic box, and in that an alarm is set off when any of said periodic sequences of binary data is not received any more by said interface electronic box after a predetermined amount of time.

13. Device for controlling a computer system according claim 1, characterized in that said sequences of binary data comprises moreover complementary sequences of binary data characteristic of the entirety of each one of said pointing devices.

14. Device for controlling a computer system according to claim 1, characterized in that each one of said pointing devices comprises moreover push-buttons in a number at least equal to 2, supplementary sequences of binary data representative of states of said push-button being included in said sequences of binary data.

15. Use of the device for controlling a computer system according to claim 1, characterized in that said computer system comprises:
- a central processing unit,
- a peripheral display, or a LCD tablet adaptable to an overhead projector, or a portable video-projector,
- an application software set of the office automation or communication type, or specific of a function or a trade, and in that said use is collective initiation with microprocessing or collective training to the use of said application software set.

16. Use of the device for controlling a computer system according to claim 1, characterized in that said computer system comprises:
- a central processing unit,
- a peripheral display, or a LCD tablet adaptable to an overhead projector, or a portable video-projector,
- an application soft-ware set of the computer-assisted presentation type, and in that said use is commercial presentation making it possible to an individual of a group of customers to choose a product or service by the means of said pointing devices, and to visualize information about said product or said service.

17. Use of the device for controlling a computer system according to claim 1, characterized in that said computer system comprises:
- a central processing unit,
- a peripheral display, or a LCD tablet adaptable to an overhead projector, or a portable video-projector,
- an application software set of the computer-assisted learning type, and in that said use is collective taking of multiple-choice examinations the answers of which are selected by the means of push-buttons of said painting devices.

18. Use of the device for controlling a computer system according to claim 1, characterized in that said computer system, said pointing devices, and said interface electronic box are placed on a trolley held at the disposal of users, trainers, presenters or teachers, to be taken along and used in buildings without special electric wiring.

19. Use of the device for controlling a computer system according claim 1, characterized in that said computer system comprises moreover a keyboard simulation software making it possible to simulate a keystroke by pointing the simulated image of said key by means of one of said pointing devices.

20. Use of the device for controlling a computer system according to claim 1, characterized in that sequences of identification binary data, for identifying which of said pointing devices are transmitting, are transmitted to said communication port, and in that said computer system comprises moreover software for allotting a cursor of different form and/or color to each one of said pointing device, according to said sequences of identification binary data received.

21. Device for controlling a computer system according to claim 8, characterized in that said line amplifier is bidirectional and transmits to said microprocessor, or said microcontroller, additional sequences of binary data representative of displacements of an additional pointing device.

22. Device for controlling a computer system according to claim 8, characterized in that said interface electronic box comprises a distinct part including said block of reception, provided with a collecting horn for collecting the infrared beams emitted by said pointing devices, and linked by a shielded cable to a principal part connected to said communication port.

* * * * *